(12) United States Patent
Barbour et al.

(10) Patent No.: US 6,789,032 B2
(45) Date of Patent: Sep. 7, 2004

(54) METHOD OF STATISTICAL BINNING FOR RELIABILITY SELECTION

(75) Inventors: Tange N. Barbour, Hinesburg, VT (US); Thomas S. Barnett, Burlington, VT (US); Matthew S. Grady, Burlington, VT (US); Kathleen G. Purdy, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/326,668

(22) Filed: Dec. 19, 2002

(65) Prior Publication Data

US 2003/0120445 A1 Jun. 26, 2003

Related U.S. Application Data

(60) Provisional application No. 60/344,209, filed on Dec. 26, 2001.

(51) Int. Cl.[7] .............................................. G06F 19/00
(52) U.S. Cl. .......................... 702/81; 702/181; 702/121
(58) Field of Search ............................. 702/81–84, 117, 702/118, 181, 33, 34, 179, 182; 700/109, 11, 121

(56) References Cited

U.S. PATENT DOCUMENTS 6,154,714 A * 11/2000 Lepejian ..................... 702/118
6,466,895 B1 * 10/2002 Harvey et al. .............. 702/181

OTHER PUBLICATIONS

C.H. Stapper, F.M Armstrong, and K. Saji, "Integrated Circuit Yield Statistics", Proceedings of the IEEE, vol. 86, Sep. 1988, pp. 1817–1836.

I. Koren and C.H. Stapper, "Yield Models for Defect Tolerant VLSI Circuits: A Review", Defect and Fault Tolerance in VLSI Systems, vol. 1, 1 Koren (ed.), Plenum, 1989, pp. 1–21.

* cited by examiner

Primary Examiner—Kamini Shah
(74) Attorney, Agent, or Firm—Robert A. Walsh (57) ABSTRACT

A statistical method is described for reliability selection of dies on semiconductor wafers using critical wafer yield parameters. This is combined with other data from the wafer or module level reliability screens (such as voltage screen or burn-in) to obtain the relative latent defect density. Finally the modeled results are compared with actual results to demonstrate confidence in the model.

11 Claims, 8 Drawing Sheets

METHOD OF STATISTICAL BINNING FOR RELIABILITY SELECTION

BACKGROUND OF THE INVENTION

This invention claims priority based on Provisional Patent Application No. 60/344,209, filed on Dec. 26, 2001.

FIELD OF THE INVENTION

This invention relates generally to testing semiconductor devices and more particularly to statistical analysis applied to burn-in testing techniques.

BACKGROUND

Semiconductor manufacturers routinely test integrated circuit product in wafer and/or packaged form to screen out defects and ensure quality levels shipped to the customer/consumer. Even after such tests are performed, however, a certain quantity of parts shipped will eventually fail to function after running in a use condition for some period of time. Such parts are said to possess 'reliability defects'; i.e. defects that are not apparent until after the parts have been 'aged' for some period of time. Many semiconductor manufacturers therefore use an acceleration technique called 'burn in' as part of their production test flow. Burn-in generally consists of exposing the part to extremes of voltage and temperature (usually high voltage and high temperature), and possibly operating the part while at these extremes. An extensive theory and practice exists that models the equivalent number of hours of use a part is 'aged' as a function of having been subjected to burn in. As a result, semiconductor manufacturers can use burn-in to artificially age and screen out many/most reliability defects in their products before shipping the parts to the consumer, and the consumer will then see a lower quantity of reliability fails.

Recently, two techniques for separating integrated circuits into bins with varying degrees of reliability have been described in the public literature which are included herein by reference:
1) local region yield (Barnett, Singh and Nelson, "Burn-In Failures and Local Region Yield: An Integrated Yield-Reliability Model", VTS 2001); and
2) repair/defect count in memory ICs or embedded memory (Barnett, Singh, Nelson, "Estimating Burn-In Fallout for Redundant Memory", ITC 2001).

In both techniques, wafer level yield information is used to make predictions about reliability behavior of different classes of die. Both techniques extend the commonly used yield model based on a negative binomial statistical distribution of defects. This yield model is characterized by parameterization of the average number of killer defects per wafer ('lambda'), and the degree to which these defects cluster ('alpha'). Added to this model is the ratio of latent or reliability defects to killer defects ('gamma').

SUMMARY OF THE INVENTION

The problem with burn-in process is that the number of parts actually possessing a reliability defect in a typical mature semiconductor process is a very small fraction of the total number of otherwise good parts (usually less than 1%, and sometimes dramatically less). On most of the product, burn-in is therefore not useful. The cost of burn-in is also becoming a larger percentage of the overall production cost as semiconductor process technology advances. This cost is increasing because newer semiconductor process technologies inherently make parts that consume more electrical power when operated at typical burn-in conditions. The problem of providing this power and maintaining the temperature of the integrated circuit makes the burn-in system more complex and costly. Therefore, methods are needed to avoid burn-in on as many parts as possible while still maintaining reasonable outgoing reliability levels.

The present invention is directed to processing of critical wafer level yield parameters and information.

Additional data from wafer or module level reliability screens (such as voltage screen or burn-in) is used to obtain the relative latent defect density (gamma). The invention is also directed to using the modeled results which are compared with actual results and applied to burn-in testing.

Others have attempted empirical methods for estimating the probability of reliability failure of a given device, given some types of wafer test information. The weakness of this type of method is that there is no linkage to known behavior of semiconductor defects, so it is difficult to have confidence that the empirical model will continue to operate correctly over time. Empirical methods also require developing some sort of history of behavior (tracking parts through wafer test through reliability screen) and so are not immediately available early in the lifetime of a product. The present invention does not suffer from either of these deficiencies.

Accordingly an object of this invention is to improve the processing wafer level yield information to obtain critical yield parameters.

Another object is using the critical yield parameters with additional data to obtain relative latent defect density.

A further object is to develop a method to reduce burn-in requirements by comparing the modeled results with actual results to improve reliability.

DETAILED DESCRIPTION OF PREFERRED EMBODIMENT OF THE INVENTION

The present invention deals with methods of separating parts into categories of different reliability levels (preferably using information when the parts are first tested in wafer form before packaging), and the application of such methods to reduction of burn-in requirements or reliability improvement. The four techniques to be used for improving the process are as follows:

1) Skip Plan—where a subset of the overall population (the subset most likely to fail) undergoes burn-in and the rest skip burn-in;
2) Picking for High Reliability—where the subset of parts least likely to fail is used for the highest reliability application, and the remainder are used for a lower reliability application;
3) Maverick Screen Improvement—where good chips from wafers designated for scrap are 'rescued' because they have low risk indications for reliability failure;
4) Burn-in Optimization—where a manufacturer has very limited burn-in capability and would like to answer the question, "If I can only burn-in X% of the parts, which parts should I select?

Several techniques for separating or binning parts into buckets that have differing degrees of reliability have been suggested. A summary of some of these techniques follows:

Once parts are separated into groups of different reliability by any of the above mentioned means, several applications are possible. Assuming that through some type of study of burn-in or field fail results, a determination was made of the overall population reliability fail rate. Such a rate is commonly referred to in units of 'fails in time' (FIT), or parts per million defective per thousand hours of use. Typically a FIT rate can be given for a population in the cases of:

no burn-in (0% burn in)
100% burn-in at a specific stress condition (usually voltage and temperature)

Given the above, the following four mathematical for binning parts may be considered for selection of these different applications may be applied are identified as skip plan, picking, materials screen, and burn-in optimization as follows:

1) Skip Plan

If 100% burn-in gives a lower than required reliability fail rate for the customer, but 0% burn-in gives too high a fail rate, then a skip plan is appropriate. One chooses as few of the worst reliability bins as possible to 'weed out' the highest number of fails as possible, until the required outgoing fail rate is met.

2) Picking for High Reliability Applications

Sometimes an integrated circuit product is used in more than one application, and these applications have different reliability requirements. The application with the requirement of the best reliability will require more burn-in or screening to get the parts to the lower fail rate. An alternative is to purposely choose the parts binned as 'most reliable' for the high reliability application, and use the remainder for the low reliability application.

3) Maverick Screen Improvement

'Whole wafer' maverick screen is used by a manufacturer in various forms. The manufacturer could instead use individual chip dispositioning based on reliability binning to get improved overall quality levels while minimizing scrap.

4) Burn-in Optimization

This may be used by a semiconductor manufacturer which is in the position of simply wanting to improve their outgoing quality level. Where a very limited amount of burn-in capacity is available, then burn-in optimization is an appropriate application. This allows the manufacturer to answer the question, "If I can only burn-in X% of the parts, which parts should I burn-in to get the largest benefit?" The worst reliability bins are chosen until the capacity is consumed.

Some manufacturers sometimes make random samples of parts to route to burn-in to get random detection of reliability defects without burning in the entire population. The advantage of the present invention is that the parts that or more or less likely to fail (as compared with a random sample of the entire population) are identified, so the burn-in done is more effective.

Techniques for separating or binning parts into buckets that have differing degrees of reliability are outlined below:

1) Local Region Yield

Figure 1:
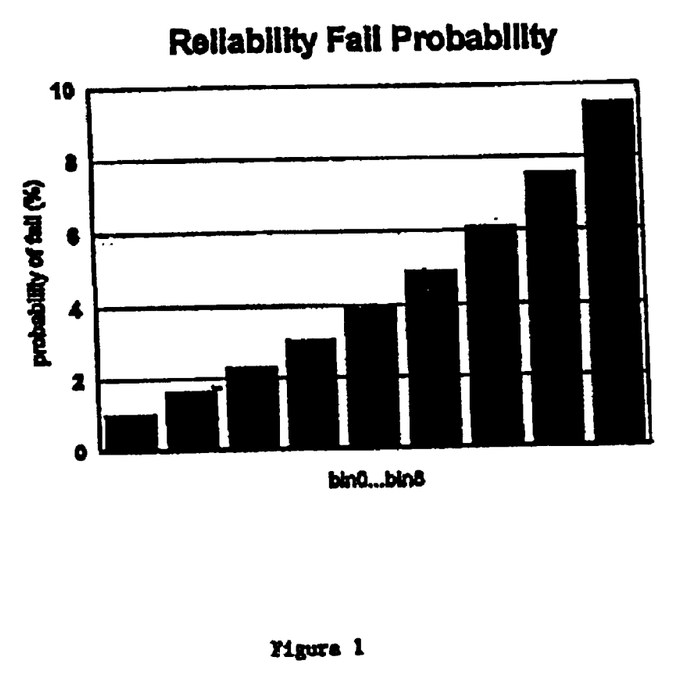
FIG. 1 is a table which illustrates reliability fail probability.

The local region yield method involves computing the count of failures of the eight chips surrounding a given die on a wafer. Each die will therefore be classified into one of eight categories (0 bad neighbors, 1 bad neighbors, etc. up to 8 bad neighbors). Depending on the amount of clustering of defects on a wafer and the average number of 'killer' (as opposed to 'latent', or reliability) defects on a wafer, the die in each bin will have a different probability of possessing a reliability defect. Die with 0 bad neighbors will have the lowest probability of having a reliability defect, while die with 8 bad neighbors will have the greatest probability of reliability failure. An illustration of this concept is shown in FIG. 1.

One can see that die in bin 8 are more than 9 times likely to contain a reliability defect as die in bin 0. An analytic mathematical model may be established to determine a fail rate relationship.

Figure 2:
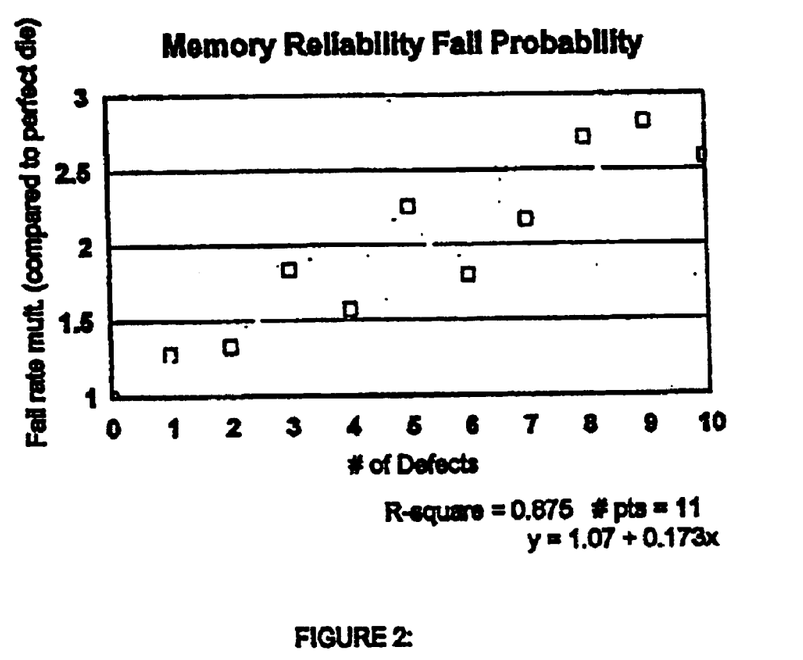
FIG. 2 is a graph which illustrates memory reliability fail probability.

2) Repair/Defect Count in Memory Ics:

Memory integrated circuits often feature redundancy that can be invoked to do a 'repair' of a faulty area of the chip. Such redundancy is used to increase the total number of yielding devices on a wafer. A mathematical model of the reliability of a particular chip is expected to be directly proportional to the number of killer defects the die possesses (and therefore repairs). Chips that are 'perfect' and require no repair will have the best reliability. As the number of repairs/defects increases, the reliability of the part decreases. An illustration of this is shown in FIG. 2.: As indicated in FIG. 2 which is based on measured burn-in fails on a memory product. The slope of the line is a function of the degree of defect clustering on the wafer. The plot agrees with the mathematical model.

3) Empirical Analysis of Wafer Yield:

A number of possible sort indicators from chips during wafer test that may best predict whether another die will pass or fail. These possible indicators are then used as inputs to a common statistical inference technique (such as multiple linear regression or partial least squares) to make an empirical correlation between whether a die yields or not. The yield of immediately neighboring die is most influential on the die in question, while the yield of the same position on other wafers in the same lot also has some influence. The weight of these factors derive a score, which determines likelihood of yielding, called the statistical predicted yield ("SPY").

An empirical demonstration that the die with high SPY are less likely to possess reliability defects, while die with low SPY are more likely to possess reliability defects. In effect, the result is separation of good die into categories with different probabilities of possessing reliability defects. The difference between this technique and 'local region yield' is that the former is empirical while the latter is analytical. The conclusions are very similar.

4) Wafer Screens and Empirical Analysis of Lot Yield:

It can be empirically demonstrated that a linear correlation may be made between the parts per million rate of 'field returns' (parts that fail after its use for some period of time, i.e. reliability defects) and the lot yield the returned part came from. Parts from lower yielding lots were more likely to become field returns than parts from higher yielding lots. The impact of adding additional 'harder' tests at the wafer test step was shown to reduce the parts per million rate of field returns. After the enhanced wafer screens were added, the field fail rate decreased. One therefore could use extended wafer screens to reduce the overall reliability fail rate, and then separate parts by lot yield to have parts with varying degrees of reliability.

5) Parametric Outlier Classification:

Many types of tests that can be done on integrated circuits yield not just a pass/fail result, but rather a numeric measurement that gives a parametric quantification of the device's behavior. Such parametric tests include (but are not limited to):

$I_{ddQ}$ testing (at one or more power supply settings, or temperatures, or pattern conditions, etc.)

Power supply range of operation in different functional modes

Frequency range of operation in different functional modes

Temperature range of operation in different functional modes

Etc

Figure 3:
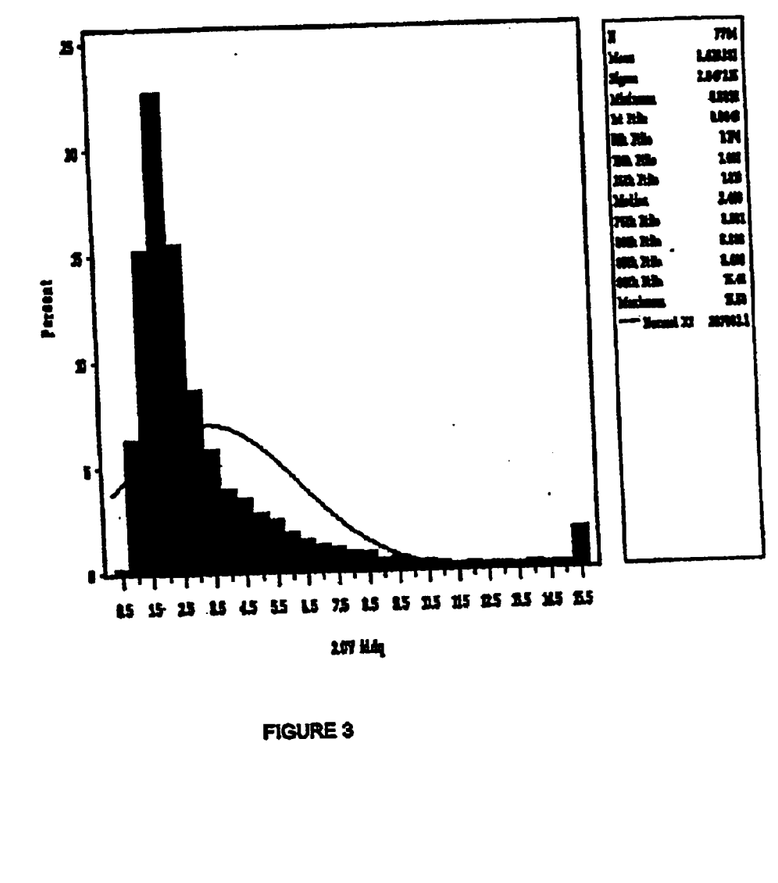
FIG. 3 is a graph which illustrates distribution of $I_{ddQ}$ measurements at a given setting.

For any one of these types of parametric measurements, the majority of the parts will be located within some type of characteristic distribution. Some, however, will fall outside of this distribution, which indicates that the part has a defect of some type. Empirical study of burn-in fallout of outlier vs. 'normal' parts can then be undertaken to determine if or such outlier parts have a higher rate of burn-in fallout. FIG. 3 shows an example of the distribution of $I_{ddQ}$ measurements for a product at a given power supply setting. There is a clear portion of the population bunched up at a low $I_{ddQ}$ reading, but there is a long tail extending out to higher readings. If the outliers turn out to be more likely to become burn-in fails, then a binning method is possible.

Other Sorting Algorithms:

An empirical study may be conducted at the burn-in fallout for parts classified with several different sorting algorithms. The algorithms include:

part is located on the edge of the wafer or not how many surrounding chips are bad how many chips fail on the same radial line as the die in question how close is a die to the edge of a wafer The conclusion reached is that edge die have a higher rate of failure, as do die surrounded by more failing chips.

Applications of Binning for Reliability

Once parts are separated into groups of different reliability by any of the above mentioned means (or any other, for that matter), several applications are possible. Assume that through some type of study of burn-in or field fail results, a determination has been made of the overall population reliability fail rate. Such a rate is commonly referred to in units of 'fails in time' (FITS), or parts per million defective per thousand hours of use. An extensive theory and practice exists for such determination. Typically a FIT rate can be given for a population in the cases of:

no burn-in (0% burn in)

100% burn-in at a specific stress condition (usually voltage and temperature)

Figure 4:
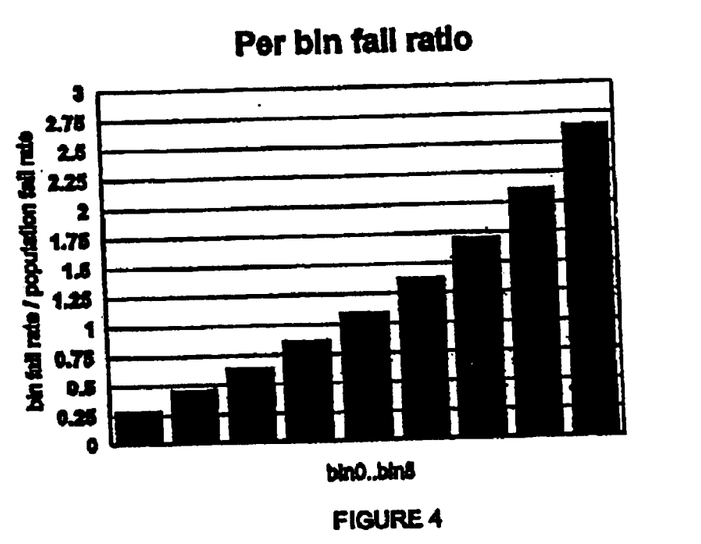
FIG. 4 is a table which table which illustrates local region yield analysis using a bin fail ratio.

Through statistical binning, we will have separated the parts into N different groups. Each group will fail at some fraction of the overall population fail rate; some will fail at a fraction less than 1, and some greater than 1. Attention is directed to FIG. 4whis shows: an example from a local region yield analysis. There are 9 bins. Bins 0–3 fail at a rate less than the overall population average, while bins 4–8 fail at a rate above the overall population average. Bin 4 is very close to failing at the same rate as the overall population (close to 1).

Wherein:

F[i]=the ratio of the fail rate of bin i to the fail rate of the overall population.

P[i]=the percentage of parts (before burn-in) that are grouped into bin i.

Pf[i]=the percentage of fails that are grouped into bin i.

N be the number of reliability bin categories.

r100 be the reliability FIT rate for the entire population if burn-in is done.

r0 be the reliability FIT rate for the entire population if burn-in is not done.

Assume the bins are ordered so that bin 1 has the smallest F[i], and bin N the highest.

Then:

N $$\sum_{i=1}^{N} P[i] = 1$$

i=1

The fail rate for any individual bin is

R100[i]=F[i]*r100 (if burin is done)

R0[i]=F[i]*r0 (if burn-in is not done)

The fail rate for a grouping of bins from 1 to n where n<=N is $$\frac{\sum R100[i] * P[i]}{\sum P[i]} \text{ (if burn-in is done ... sums are from 1 ... } n\text{)} \quad \text{(eq 1):}$$

or $$\frac{\sum R0[i] * P[i]}{\sum P[i]} \text{ (if burn-in is not done ... sums are from 1 ... } n\text{)} \quad \text{(eq 2):}$$

If burn-in is only done on the worst bins, so that bins 1 through n are skipped, then the overall outgoing fail rate of the population is $$\frac{\sum Pf[i]}{100 * (r100 - r0)} + r100 \text{ (sum from } i = 1 \text{ to } n\text{)} \quad \text{(eq 3):}$$

Given the above relationships, the following applications arise:

1) Skip Plan

Figure 5:
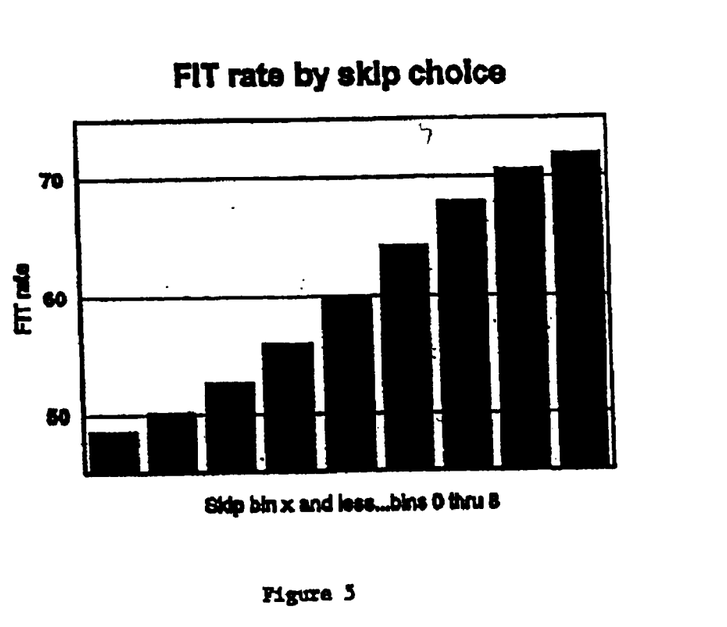
FIG. 5 is a table which illustrates a failure rate by chip choice.

Equation 3 gives a reliability fail rate when the best reliability bins are skipped. If r100 is better than the required outgoing fail rate, but r0 is too poor, then one can use a skip plan to burn-in the worst yielding portion of the population and still achieve the required reliability. Here is an illustration of such a skip plan:

FIG. 5 illustrates an example from an actual microprocessor, r100 is 48 FITs and r0 is 72 FITs. There are 9 bins (based on local region yield). If 60 FITs is the outgoing reliability requirement, bins 0 through 4 can skip burn-in. In the case of this product, bins 0 through 4 make up 70% of the parts, so the burn-in savings are substantial.

2) Picking for High Reliability Applications

Figure 6:
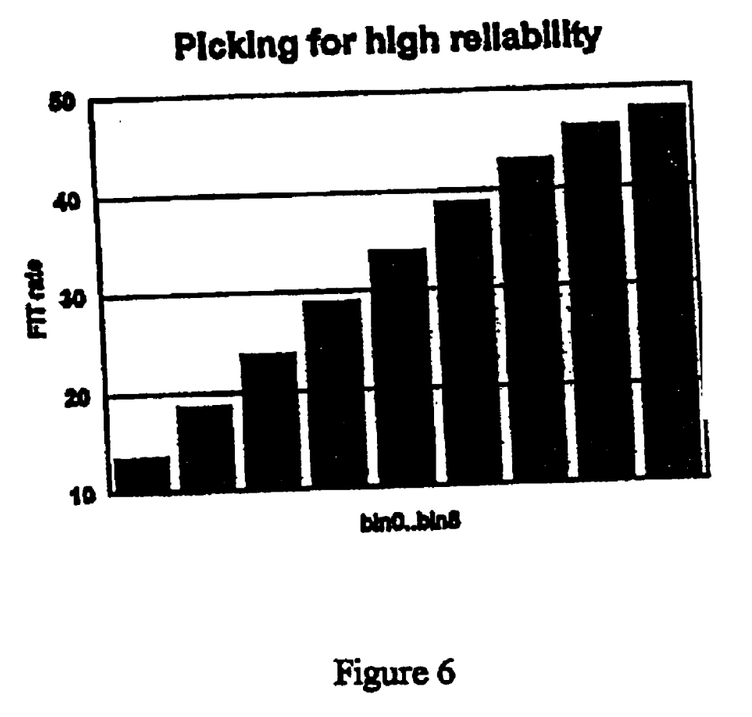
FIG. 6 is a table which illustrates a high reliability product.

Often times a certain portion of production of a product is targeted for a high reliability application. If the entire population is used to fulfill this application, the burn-in duration required can be excessive. However, if only the best few reliability bins are selected, then a more 'normal' burn-in duration can be used. This relation is described in equation 1; a portion of the population can be used to get to a fail rate that is less than r100. Alternatively, if no burn-in is planned, then equation 3 can be used to still pick a portion of the population that will meet a higher reliability requirement than r0. Attention is directed to FIG. 6 which illustrates an application where, r100 is 48 FITs. Bins 0 through 2 can be chosen to achieve a portion of the population with outgoing reliability of 24 FITs (half the fail rate of the overall population).

3) Maverick Screen Improvement

Semiconductor manufacturers often try to improve the overall outgoing quality of their product by screening or scrapping material that appears to have 'outlier' characteristics. Yield of wafers is the most common example; if a product is typically yielding 50%, and a small portion (say, 10%) of the wafers are yielding below a limit of, say 15%, then a manufacturer may decide to scrap the good devices from all wafers yielding less than 15%. The methods listed above for separating parts into reliability bins are acting on more 'direct' information that just wafer yield, so scrap plans based on these bin methods will do a better job of screening hardware for mavericks.

For example, on the low yielding wafers in the example above, there will probably be some areas of the wafer with good chips that have good reliability indicators (i.e.—they are in a region of high yield, or they do not require array redundancy/repair, etc.). Good die from such areas should not be scrapped. Conversely, there will be good yielding wafers with good die that have indications of poor reliability (i.e.—the chips are in a region of a wafer with poor local region yield, or the chips require a lot of redundancy/repair, etc.). Such chips might be candidates for scrap, or at least more burn-in.

4) Burn-in optimization (108) Often times semiconductor manufacturers have limited capability for burn-in of product. In these situations, the critical question is, "What percentage of the population can I burn in?" Binning for reliability helps in this situation by identifying the chips that are most likely to contain reliability defects. If the manufacturer has capacity for burn-in of, say 25% of the product, then one can choose starting with bin N (the least reliable bin) and working down the list until the capacity is consumed. This assures the most optimal use of the limited burn-in resource.

The following is a detailed description of a local yield method.

Figure 7:
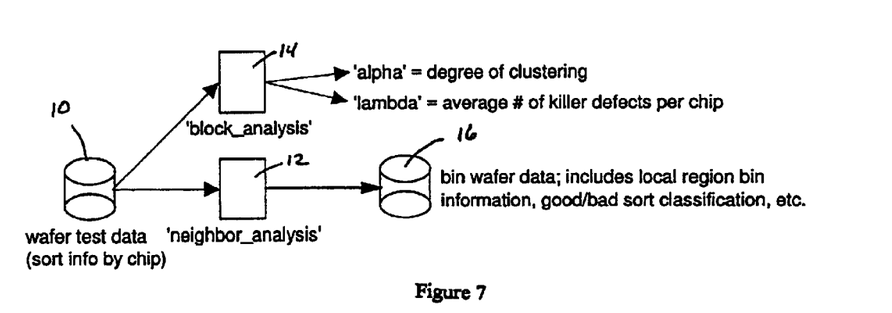
FIG. 7 is a flow diagram of local region yield analysis.

Attention is directed to FIG. 7 which represents the flow of the local region yield analysis. The local region yield method involves using wafer test data 10 which is sorted by chip and computing the count of failures of the neighboring chips 12 surrounding a given die on a wafer. If the nearest eight dies are considered, for example, each die will therefore be classified into one of eight categories (0 bad neighbors, 1 bad neighbors, etc. up to 8 bad neighbors). Depending on the amount of clustering of defects on a wafer and the average number of 'killer' (as opposed to 'latent', or reliability) defects on a wafer, the die in each bin will have a different probability of possessing a reliability defect. Die with 0 bad neighbors will have the lowest probability of having a reliability defect, while die with 8 bad neighbors will have the greatest probability of reliability failure.

The key to this method is the fact that defects on wafers tend to distribute themselves according to negative binomial statistics (C. H. Stapper, F. Armstrong, and K. Saji, "Integrated Circuit Yield Statistics", Proceedings of the IEEE, Vol. 86, September 1988, pp. 1817–1836). This distribution is characterized by two parameters; the average number of killer defects per chip ($\lambda\kappa$) and the degree to which defects cluster ($\alpha$). These two parameters can be estimated from an analysis of wafer yield, using a technique known as 'windowing' (I. Koren and C. H. Stapper, "Yield Models for Defect Tolerant VLSI Circuits: A Review", Defect and Fault Tolerance in VLSI Systems, Vol. 1, I. Koren (ed.), Plenum, 1989, pp. 1–21). One begins with the relation:

$$Y_k(n) = \left(1 + \frac{n\lambda_k}{\alpha}\right)^{-\alpha}$$

where $Y_k(n)$ is the wafer probe yield for chips taken in groups of n. Thus $Y_k(1)$ is the ordinary wafer probe yield, $Y_k(2)$ is the wafer yield with chips taken two at a time, etc. Once the data is obtained (from wafer test data 10) for several values of n, a nonlinear least squares algorithm is performed to obtain the values of $\alpha$ and $\lambda_K$ by block analysis 14. Given burn-in or wafer level reliability screen data, one can also determine the ratio of latent or reliability defects to killer defect ($\gamma$). The yield of die which pass wafer probe (die with no killer defects) following reliability screen ($Y_L$) is given by:

$$Y_L = \left[1 + \gamma\left(1 - Y_k^{\frac{1}{\alpha}}\right)\right]^{-\alpha}$$

As $\gamma$ is the only unknown in this equation, its value can be obtained since the values of $Y_K$, $Y_L$, $\lambda_k$ and $\alpha$ which are known.

Given these parameters $\lambda$, $\alpha$, and $\gamma$ one can calculate the distribution of good die in each of the bin categories (0–8), as well as the distribution of reliability fails in each bin 16. These calculated distributions can then be compared with actual distributions from manufacturing data to demonstrate confidence in the model.

In addition, one can use an automated program or a tool such as a spreadsheet to encode the yield/reliability model equations, and then examine tradeoff issues of applications such as:

skipping reliability screening (such as burn-in) on the parts from better bins;

choosing the best bins for high reliability applications;

optimizing reliability screening (more burn-in on parts from worse bins);

etc.

These techniques were described above.

Figure 8:
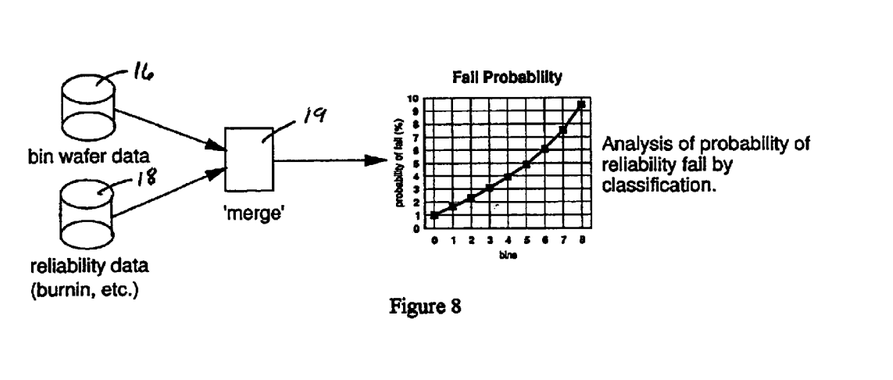
FIG. 8 is a flow diagram and graph showing probability of fails vs. bin number.
Figure 9:
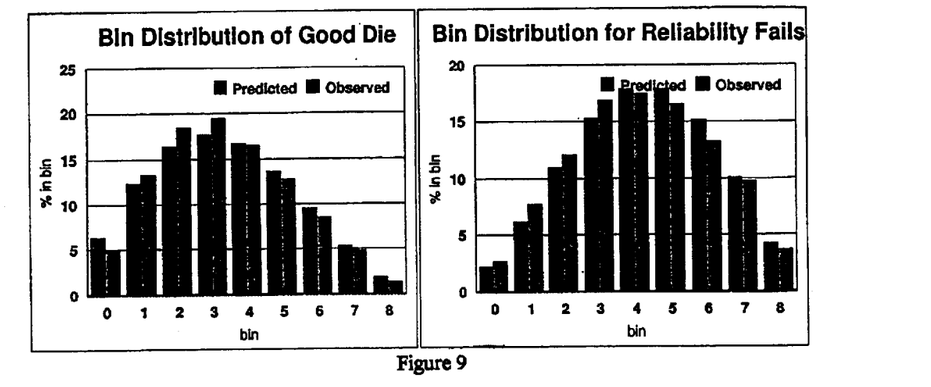
FIG. 9 are bar charts showing predicted and actual distribution.

The wafer test data 10 is a table that contains wafer ID, X/Y coordinates of the chip, and the wafer test sort result. These data are input into two routines. The 'block_analysis' 14 routine extracts $\alpha$ and $\lambda_k$ using windowing, as described above. The 'neighbor_analysis' 12 routine analyzes and computes the local region yield bin for each device. The final piece of information is the pass/fail disposition of the good wafer die following reliability screen (wafer-level voltage stress, module-level burn-in, etc.)18. The bin wafer data 16 and reliability data 18 are merged as shown in FIG. 8:

The 'merge' routine 19 gives the actual results of probability of reliability screen fail by local region yield bin, and calculates the value of $\gamma$. Given the values of $\alpha$, $\lambda_K$, and $\gamma$, one can obtain predicted distributions of good devices by local region yield bin, as well as distributions of devices that fail reliability screen by local region yield bin. Predicted and actual can then be compared as shown in FIG. 9.

Repair Count in Memory ICs

The repair count method involves computing the count of the number of embedded memory repairs for a given die on a wafer. Die will therefore be classified into one of many bins (0 repairs required, 1 repair, etc.) up to the repair limit of the die based on the design of redundancy). Depending on the amount of clustering of defects on a wafer and the average number of 'killer' (as opposed to 'latent', or reliability) defects on a wafer, the die in each bin will have a different probability of possessing a reliability defect. Die with 0 repairs will have the lowest probability of having a reliability defect, while die with larger and larger repair counts will have the greatest probability of reliability failure.

Again, the fact that defects tend to distribute according to negative binomial statistics is key to this method, as described in "Estimating Burn-In Fallout for Redundant Memory". Clustering of defects ($\alpha$) and defect density ($\lambda_K$) determine the yield for die with no repairs:

$$Y_K = \left(1 + \frac{\lambda_k}{\alpha}\right)^{-\alpha}$$

Since repair is available, the defect density is effectively made smaller (since some die with killer defects can be repaired and used as good devices). If the probability that a given killer defect can be repaired is given by $\rho_R$, then the effective average number of killer defects per chip is given by:

$$\lambda_{Keff} = (1 - P_R)\lambda_K$$

As the effective defect density is reduced, the wafer yield is improved and is described by:

$$Y_{Keff} = \left[1 + \frac{\lambda_{Keff}}{\alpha}\right]^{-\alpha}$$

Since the defects distribute according to negative binomial statistics, the probability a die has "m" killer defects is given by:

$$P[K_{(m)}] = \frac{\left(\Gamma_{(\alpha+m)}\left(\frac{\lambda_k}{\alpha}\right)\right)^m}{m!\left(\Gamma_{(\alpha)}\left(1 + \frac{\lambda_k}{\alpha}\right)\right)^{\alpha+m}}$$

where $\Gamma(x)$ is the gamma function. Then, the fraction of functional chips with m repairs is given by:

$$f(m) = \frac{(Pr)^m P[K(m)]}{Y_{Keff}}$$

As the fraction of chips with "m" repairs is known from the wafer test data, a nonlinear least squares algorithm can be performed to obtain the values of $\alpha$ and $\lambda_{78}$ (and therefore $\lambda_{Keff}$)

In addition, given burn-in or wafer level reliability screen data, one can also determine the ratio of latent or reliability defects to killer defects ($\gamma$). The yield of passing die with "m" defects following reliability screen ($Y_L(m)$) is given by:

$$Y_L(m) = \left[1 + \frac{\lambda_L(m)}{\alpha + m}\right]^{-(\alpha+m)}$$

Where $\lambda_L$ (m) the average number of reliability defects given there are "m" killer defects, is:

$$\lambda_L(m) = \frac{a+m}{\alpha}\lambda_L(0) = (\alpha+m)\gamma(1 - (Y_k)^{1/\alpha})$$

As $\gamma$ is the only unknown in this equation, its value can be obtained since the values of $Y_K$, $Y_L(m)$ and $\alpha$ are known.

Given these parameters ($\lambda_K$, $\alpha$ and $\gamma$), one can calculate the distribution of good die in each of the repair bin categories, as well as the distribution of reliability fails in each bin. These calculated distributions can then be compared with actual distributions from manufacturing data to demonstrate confidence in the model.

In addition, one can use a program or tool such as a spreadsheet to encode the yield/reliability model equations, and then examine tradeoff issues of applications, as described in the local region yield discussion above.

Figure 10:
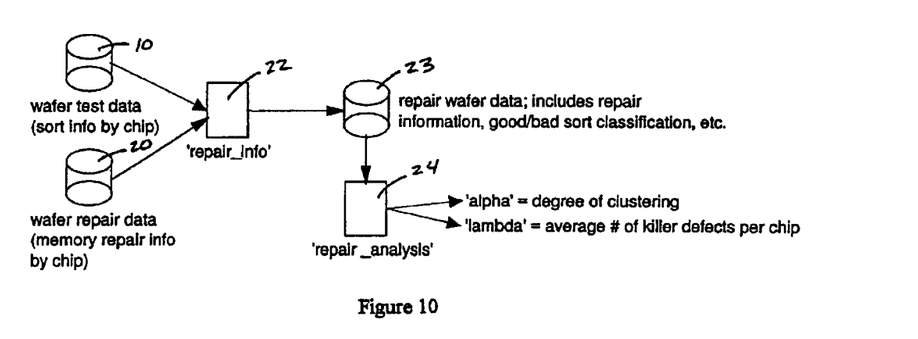
FIG. 10 is a flow diagram to determine alpha and lambda parameters.

Attention is directed to FIG. 10 for an illustration of the flow of information.

Figure 11:
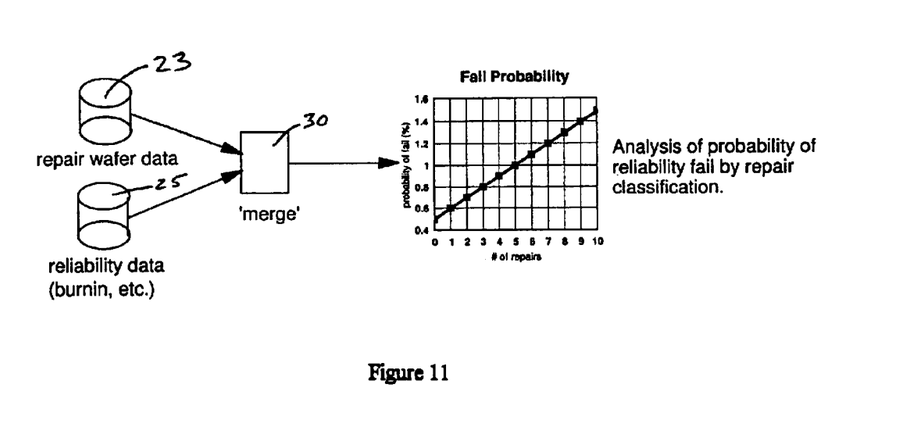
FIG. 11 is a flow diagram and graph showing probability of fails vs. number of repairs.

The wafer test data 10 is a table that contains wafer ID, X/Y coordinates of chip, and the wafer test sort result. The wafer repair data 20 is a table that contains wafer ID, X/Y coordinates of the chip, and the repair actions (if any) required for the device. These data are input into a routine that merges the data sets in 'repair-info routine 22 and produces a combined data set with both sort and repair data 23. The 'repair_analysis' routine 24 then extracts and by fitting the repair distribution, as described above. The final piece of information is the pass/fail disposition of the good wafer die following reliability screen (wafer-level voltage stress, module-level burn-in, etc.). The repair wafer data 23 and reliability data 25 are merged as shown in FIG. 11.

Figure 12:
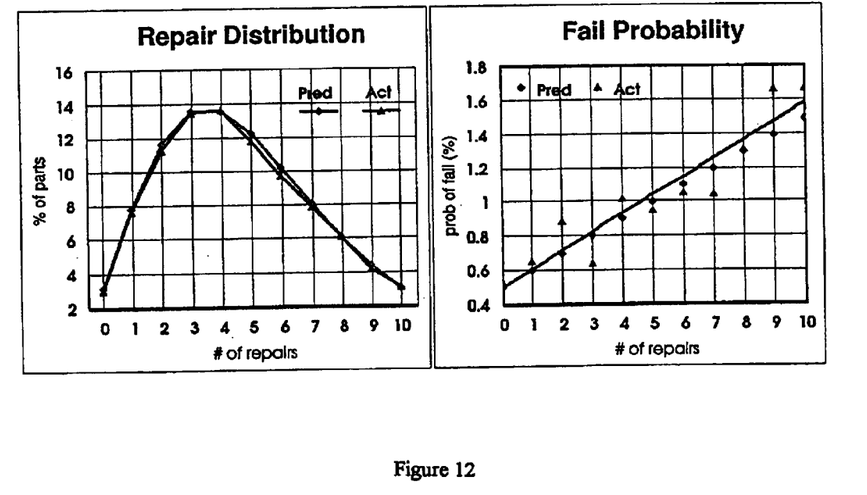
FIG. 12 are graphs showing repair distribution and fail probability.

The 'merge' routine 30 gives the actual results of probability of reliability screen fail by repair count, and calculates the value of $\gamma$. Given the values of $\alpha$, $\lambda_K$, and $\gamma$, one can obtain predicted distribution of repair of good devices, as well as probability of failing reliability screen by repair count. Predicted and actual can then be compared as shown in FIG. 12.

While the invention has been descried in terms of preferred embodiments, those skilled in the art will recognize that the invention can be practiced with modification within the spirit and scope of the appended claims.

What is claimed:

1. A statistical method for reliability selection of dies on semiconductor wafers to be tested comprising:
   collecting test data from each of a plurality of wafers to obtain actual results of each die;
   extracting a yield model of certain parameters from the test data; and
   comparing the yield model and actual reliability data to obtain a distribution of good die reliability fails based on negative binomial statistical modeled results and actual results.

2. The method of claim 1 which includes:
   analyzing the test data to determine relationships between the dies.

3. The method of claim 2 in which the resultant relationship is the location of the failing dies.

4. The method of claim 3 in which the resultant relationship is used to determine the number of fails of neighboring die surrounding any given die.

5. A statistical method for reliability selection of dies on semiconductor wafers to be tested comprising:
- collecting test data from each of a plurality of wafers to obtain actual results of each die;
- extracting a yield model of certain parameters from the test data;
- analyzing the test data to determine relationships between the dies wherein the resultant relationship is the number of embedded repairs on a particular die; and
- comparing the yield model and actual reliability data to obtain a distribution of good die reliability fails based on modeled results and actual results.

6. A statistical method for reliability selection of dies on semiconductor wafers to be tested comprising:
- collecting test data from each of a plurality of wafers to obtain actual results of each die;
- extracting a yield model of certain parameters from the test data wherein parameters include killer defects per wafer, degree of clustering of idler defects, and the ratio of latent defects to killer defects; and
- comparing the yield model and actual reliability data to obtain a distribution at good die reliability fails based on modeled results and actual results.

7. A statistical method for reliability selection of dies on semiconductor wafers to be tested comprising:
- collecting test data from each of a plurality of wafers to obtain actual results of each die;
- comparing the yield model and actual reliability data to obtain a distribution of good die reliability fails based on modeled results and actual results wherein the parameters are used to calculate the distribution of good die in each bin category and distribution of reliability fails in each bin.

8. A statistical method for reliability selection of dies on semiconductor wafers to be tested comprising:
- collecting test data from each of a plurality of wafers,
- determining certain parameters based on average number of killer defects in a wafer;
- computing the number of embedded repairs for each die;
- classifying the die into a number of bins based on the number of repairs and clustering to determine the distribution of good die in each bin; and
- comparing the classification of the die with actual distributions.

9. A statistical method for reliability selection of dies on semiconductor wafers to be tested comprising:
- collecting test data from each of a plurality of wafers;
- determining certain parameters based on average number of killer defects in a wafer wherein the parameters include clustering of defects and defect density;
- computing the number of embedded repairs for each die;
- classifying the die into a number of bins based on the number of repairs and clustering to determine the distribution of good die in each bin; and
- comparing the classification of the die with actual distributions.

10. The method of claim 9 wherein the die in each bin will have a different probability of possessing a reliability defect.

11. The method of claim 10 wherein the bin with zero repairs will have the lowest probability of having a reliability defect.

* * * * *